(12) United States Patent
Liu et al.

(10) Patent No.: US 12,099,274 B2
(45) Date of Patent: Sep. 24, 2024

(54) BACKLIGHT MODULE AND DISPLAY DEVICE

(71) Applicant: HKC CORPORATION LIMITED, Shenzhen (CN)

(72) Inventors: Hao Liu, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/518,986

(22) Filed: Nov. 25, 2023

(65) Prior Publication Data

US 2024/0176187 A1   May 30, 2024

(30) Foreign Application Priority Data

Nov. 25, 2022   (CN) .......................... 202211489006.0

(51) Int. Cl.
*G02F 1/1333*   (2006.01)
*F21V 8/00*   (2006.01)
(Continued)

(52) U.S. Cl.
CPC ..... *G02F 1/133607* (2021.01); *G02B 6/0025* (2013.01); *G02B 6/0028* (2013.01); *G02F 1/133603* (2013.01)

(58) Field of Classification Search
CPC ......... G02F 1/133607; G02F 1/133603; G02B 6/0033; G02B 6/0046; G02B 6/0048
See application file for complete search history.

(56) References Cited

U.S. PATENT DOCUMENTS

| 2008/0158663 A1* | 7/2008 | Hsu ........................ C09D 7/67 359/359 |
| 2012/0002437 A1 | 1/2012 | Yabe et al. |
| 2012/0134179 A1* | 5/2012 | Que ..................... G02B 6/0045 362/616 |

FOREIGN PATENT DOCUMENTS

| CN | 102313174 A | 1/2012 |
| CN | 103900031 A | 7/2014 |

(Continued)

OTHER PUBLICATIONS

Office Action issued Nov. 1, 2023, on Chinese Application No. CN202211489006.0 filed Nov. 25, 2022. English Translation attached.

(Continued)

*Primary Examiner* — Julie A Bannan
(74) *Attorney, Agent, or Firm* — Franklin & Associates International Inc; Matthew F. Lambrinos

(57) ABSTRACT

The present application relates to a backlight module and a display device. The backlight module includes a light source, a light guide plate, and a diffusion film; the light guide plate includes a light guide incident surface facing the light source and a light guide emergent surface facing a light emitting direction, a peripheral edge of the light guide emergent surface is a refractive surface, and a distance from an outer edge of the refractive surface to the light guide incident surface is longer than a distance from an inner edge of the refractive surface to the light guide incident surface; and the diffusion film includes a diffusion incident surface and a diffusion emergent surface, and a shape of the diffusion incident surface is fitted to a shape of the light guide emergent surface. The direction and strength distribution of an emitting light path can be changed, and light leakage caused by ray overflow from a backplane due to ray concentration on the edge can be reduced. Moreover, by such a design, restrictions on a sealing strip and a border shading (Continued)

function can be eliminated, and technical support for "borderlessness" can be provided.

12 Claims, 7 Drawing Sheets

(51) Int. Cl.
*G02F 1/1335* (2006.01)
*G02F 1/13357* (2006.01)

(56) References Cited

FOREIGN PATENT DOCUMENTS

| CN | 104949011 A | 9/2015 |
|---|---|---|
| CN | 105807492 A | 7/2016 |
| CN | 106090729 A | 11/2016 |
| CN | 106707616 A | 5/2017 |
| CN | 206906761 U | 1/2018 |
| CN | 108562969 A | 9/2018 |
| CN | 109783489 A | 5/2019 |
| CN | 211293330 U | 8/2020 |
| CN | 114924344 A | 8/2022 |
| CN | 115220263 A | 10/2022 |
| CN | 115542611 A | 3/2023 |
| KR | 20120055890 A | 6/2012 |

OTHER PUBLICATIONS

Notice of Allowance and fee due issued Jul. 2, 2023, on Chinese Application No. CN202211489006.0 filed Nov. 25, 2022. English Translation attached.
English Version of Notice of Allowed Claims issued Jul. 2, 2023, on Chinese Application No. CN202211489006.0 filed Nov. 25, 2022.

* cited by examiner

BACKLIGHT MODULE AND DISPLAY DEVICE

CROSS REFERENCE TO RELATED APPLICATIONS

The present application claims the priority of the Chinese patent application No. 202211489006.0, filed on Nov. 25, 2022, titled "Backlight Module and Display Device", the entire contents of which are incorporated herein by reference.

FIELD

The present application relates to the technical field of display, in particular to a backlight module and a display device.

BACKGROUND

For an existing liquid crystal display panel, a backlight module is generally used to provide a backlight source for the display panel. In general, a fit clearance is reserved between a light guide plate and a border of the backlight module, and the backlight module is a typical uniform surface light source, that is, there will also be a light source on an edge of the backlight module, and it is greatly possible to form light leakage at the clearance between the border and the light guide plate.

At present, the backlight module has widely applied a light-emitting diode as a light source. The brightness of the light-emitting diode is very high, so that light leakage is easier to reach a visual area of the panel, and then, a phenomenon of nonuniform picture brightness is caused. In addition, because a screen border of a current portable electronic device is getting smaller and smaller, it is impossible to enlarge the border to avoid light leakage. If the border is prepared from a black material, light leakage can be reduced by avoiding light reflection from the border, but the overall brightness of the backlight module will be greatly lowered.

In conclusion, in the existing backlight module, it is still impossible to effectively solve the problem of edge leakage without affecting the overall brightness and border size of the backlight module.

SUMMARY

The objectives of the present application are to provide a backlight module and a display device, by which the problem of edge light leakage can be effectively solved.

In a first aspect, an embodiment of the present application provides a backlight module, including a light source, a light guide plate, and a diffusion film; the light source being configured to provide a light source: the light guide plate including a light guide incident surface facing the light source and a light guide emergent surface facing a light emitting direction, a peripheral edge of the light guide emergent surface being a refractive surface, and a distance from an outer edge of the refractive surface to the light guide incident surface being longer than a distance from an inner edge of the refractive surface to the light guide incident surface: and the diffusion film including a diffusion incident surface and a diffusion emergent surface, and a shape of the diffusion incident surface being fitted to a shape of the light guide emergent surface.

In a second aspect, an embodiment of the present application provides a display device, including a display module and a backlight module which is the backlight module mentioned as above.

According to the backlight module and the display device provided in the embodiment of the present application, it is proposed in the embodiment of the present application that an outer side of a bonding interface between the diffusion film and the light guide plate is formed as the refractive surface, and the distance from the outer edge of the refractive surface to the light guide incident surface is longer than the distance from the inner edge of the refractive surface to the light guide incident surface, by which an inclined bonding surface is formed, and thus, a dark area where no backlight rays can enter can be formed on an edge of the backlight module by virtue of the refractive surface. By utilizing the embodiment of the present application, the direction and strength distribution of an emitting light path can be changed, and light leakage caused by ray overflow from a backplane due to ray concentration on the edge can be reduced. Moreover, by such a design, restrictions on a sealing strip and a border shading function can be eliminated, and technical support for borderlessness can be provided.

BRIEF DESCRIPTION OF DRAWINGS

The features, advantages and technical effects of exemplary embodiments of the present application will be described as below with reference to accompanying drawings. In the accompanying drawings, the same component is indicated by the same numeral in the accompanying drawings. The accompanying drawings are not drawn in actual proportions, and are only intended to indicate a relative positional relationship, a thickness of each of some parts is drawn in an exaggerated way to facilitate understanding, and a layer thickness in each of the accompanying drawings does not represent a proportional relationship of an actual layer thickness.

DESCRIPTION FOR NUMERALS IN THE ACCOMPANYING DRAWINGS 1, backplane: 2, light source: 3, light guide plate: 31, refractive surface; 4, diffusion film: 41, adaptive surface: 42, boundary line: 8, display module; B, dark area; 91, backplane: 92, light source: 93, light guide plate: 94, diffusion film: 95, outer frame: 96, circuit board: 97, support part: and 98, display module.

DETAILED DESCRIPTION

Features and exemplary embodiments in various aspects of the present application will be described in detail as below. In the following detailed description, a plurality of concrete details are provided to facilitate comprehensive understanding for the present application. However, it is clear to the skilled in the art that the present application can be implemented without some of these concrete details. The following description for embodiments is only intended to show examples of the present application so as to provide better understanding for the present application. In the accompanying drawings and the following description, at least parts of known structures and technologies are not shown to avoid unnecessary ambiguity in the present application; and, for clarity, it is possible to exaggerate sizes of regional structures. In addition, the features, structures or characteristics described hereinafter can be combined in one or more embodiments in any appropriate way.

Figure 1:
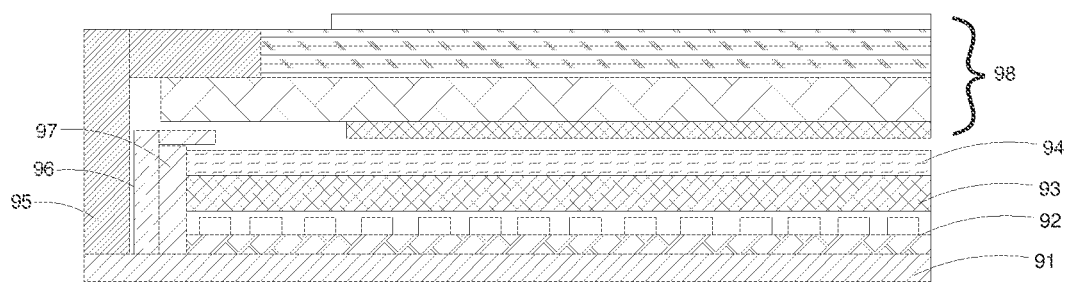
FIG. 1 shows a schematic structural diagram of a display device in a first embodiment.
Figure 2:
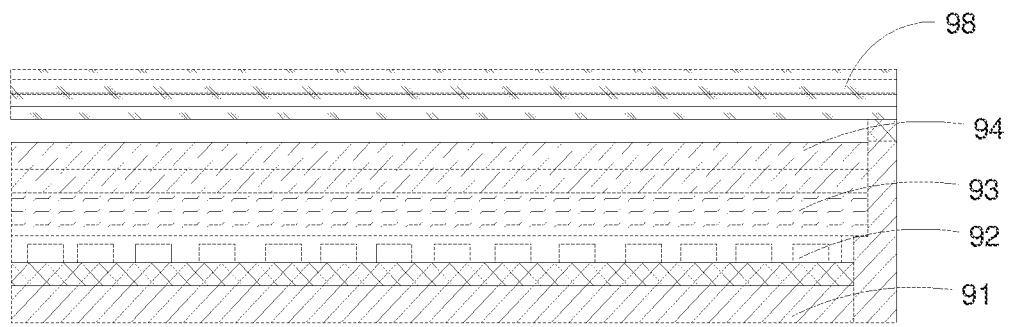
FIG. 2 shows a schematic structural diagram of a local section of a display panel in the first embodiment.
Figure 3:
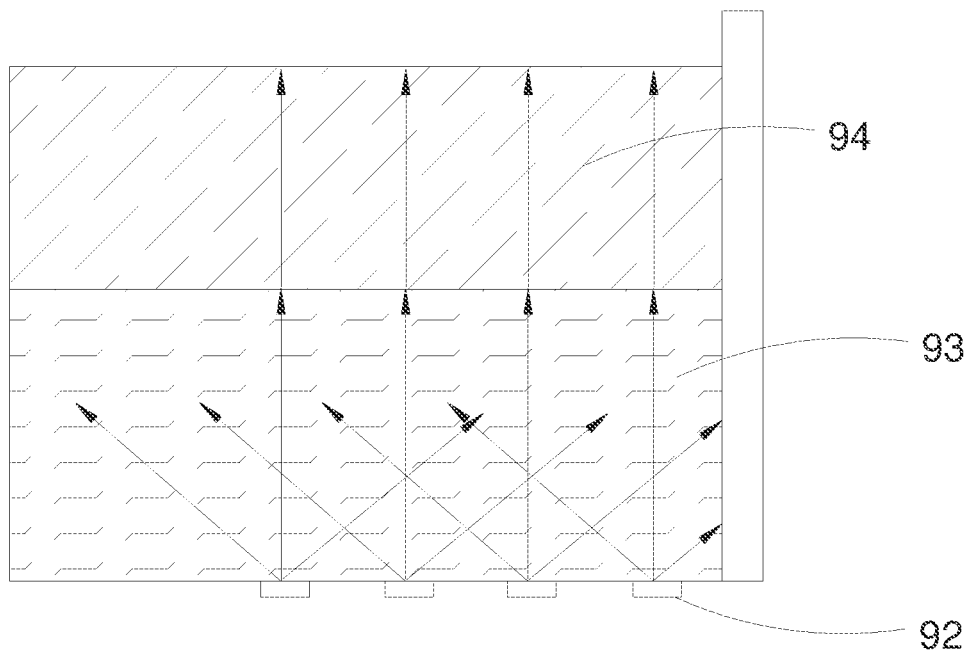
FIG. 3 shows a schematic structural diagram of a local section at an edge of a backlight module in the first embodiment.

FIG. 1 shows a schematic structural diagram of a display device in a first embodiment, FIG. 2 shows a schematic structural diagram of a local section of a display panel in the first embodiment, and FIG. 3 shows a schematic structural diagram of a local section at an edge of a backlight module in the first embodiment.

As shown in FIG. 1 to FIG. 3, the display device mainly includes a backplane 91, a light source 92, a light guide plate 93, a diffusion film 94 and a display module 98 from a backlight layer to a display layer, wherein a support part 97 is disposed on an edge of the backplane 91 to support the display module 98, an outer side of the display device is sealed by an outer frame 95, and a circuit board 96 may be disposed between the outer frame 95 and the support part 97. The display module 98 generally includes an array substrate and a color film substrate which are packaged into a whole by a box pairing process.

As shown in FIG. 2, the light source 92 may be a MiniLED/MicroLED light source plate, and the backlight module in the present embodiment belongs to a direct-light-type backlight module, referring to a schematic diagram of a light path at an edge of a backlight module shown in FIG. 3 in which light is uniformly distributed on the edge of the backlight module, light leakage on the edge is easier to reach a visual area of the panel, and then, the phenomena of light leakage and nonuniform picture brightness are caused. In addition, because a screen border of a current portable electronic device is getting smaller and smaller, it is impossible to enlarge the border to avoid light leakage. If the border is prepared from a black material, light leakage can be reduced by avoiding light reflection from the border, but the overall brightness on the edge of the backlight module will be greatly lowered.

In order to solve the problem of light leakage on the edge, it is proposed in the embodiment of the present application that an outer side of a bonding interface between the diffusion film and the light guide plate is formed as the refractive surface, and a distance from an outer edge of the refractive surface to a light guide incident surface is longer than a distance from an inner edge of the refractive surface to the light guide incident surface, by which an inclined bonding surface is formed, and thus, a dark area where no backlight rays can enter can be formed on the edge of the backlight module by virtue of the refractive surface. By utilizing the embodiment of the present application, the direction and strength distribution of an emitting light path can be changed, and light leakage caused by ray overflow from the backplane due to ray concentration on the edge can be reduced. Moreover, by such a design, restrictions on a sealing strip and a border shading function can be eliminated, and technical support for "borderlessness" can be provided. The embodiments of the present application will be illustrated as below in conjunction with the accompanying drawings.

Figure 4:
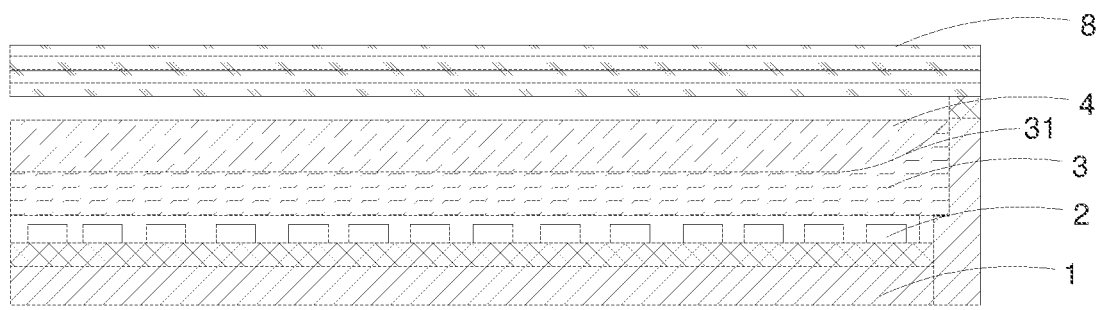
FIG. 4 shows a schematic structural diagram of a section of a display panel in a second embodiment.
Figure 5:
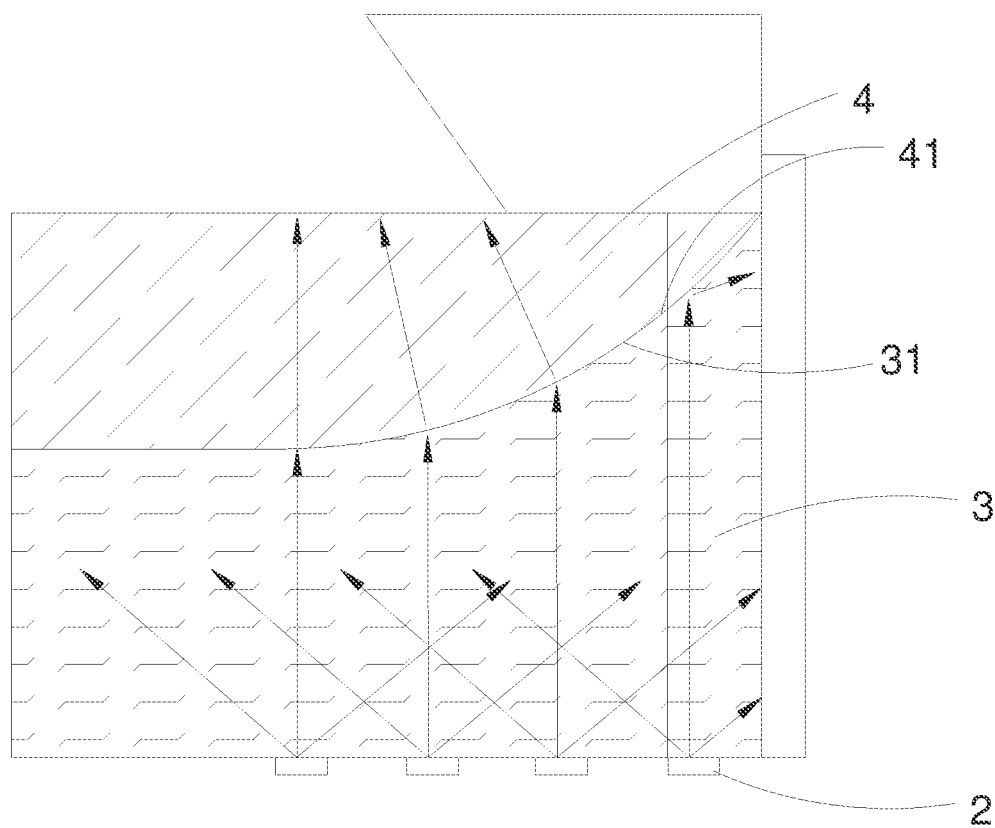
FIG. 5 shows a schematic structural diagram of a local section at an edge of a backlight module in a second embodiment.

FIG. 4 shows a schematic structural diagram of a section of a display panel in a second embodiment, and FIG. 5 shows a schematic structural diagram of a local section at an edge of a backlight module in a second embodiment.

An embodiment of the present application provides a backlight module, mainly including a light source 2, a light guide plate 3, and a diffusion film 4. The light source 2 is configured to provide a light source: the light guide plate 3 includes a light guide incident surface facing the light source 2 and a light guide emergent surface facing a light emitting direction, wherein a peripheral edge of the light guide emergent surface is a refractive surface 31, the peripheral edge of the light guide emergent surface is usually understood to include four lateral edges located on the periphery, it is seen from the section that a distance from an outer edge of the refractive surface 31 to the light guide incident surface is longer than a distance from an inner edge of the refractive surface 31 to the light guide incident surface. That is, outer edges of the lateral edges of the refractive surface 31 are all protruded to the light emitting direction, the diffusion film 4 includes a diffusion incident surface and a diffusion emergent surface, and a shape of the diffusion incident surface is fitted to a shape of the light guide emergent surface.

It is proposed in the embodiment of the present application that an outer side of a bonding interface between the diffusion film 4 and the light guide plate 3 is formed as the refractive surface 31, and the distance from the outer edge of the refractive surface 31 to the light guide incident surface is longer than the distance from the inner edge of the refractive surface to the light guide incident surface, by which an inclined bonding surface is formed, and thus, a dark area B where no backlight rays can enter can be formed on the edge of the backlight module by virtue of the refractive surface, and the dark area covers the peripheral edge of the screen, thereby avoiding light leakage on the edge. By utilizing the embodiment of the present application, the direction and strength distribution of an emitting light path can be changed, and light leakage caused by ray overflow from the backplane due to ray concentration on the edge can be reduced. Moreover, by such a design, restrictions on a sealing strip and a border shading function can be eliminated, and technical support for "borderlessness" can be provided. It can also be understood that the bonding interface between the diffusion film 4 and the light guide plate 3 is formed by the refractive surface 31, such a bonding interface obliquely points to the outer edge of the diffusion film 4 as a whole, on one hand, light close to an inner side of the bonding interface is refracted to a central part, and on the other hand, light close to an outer side of the bonding interface is reflected to the outer side, and thus, the dark area where no rays enter is formed on the outer edge pointed by the bonding interface.

Figure 6:
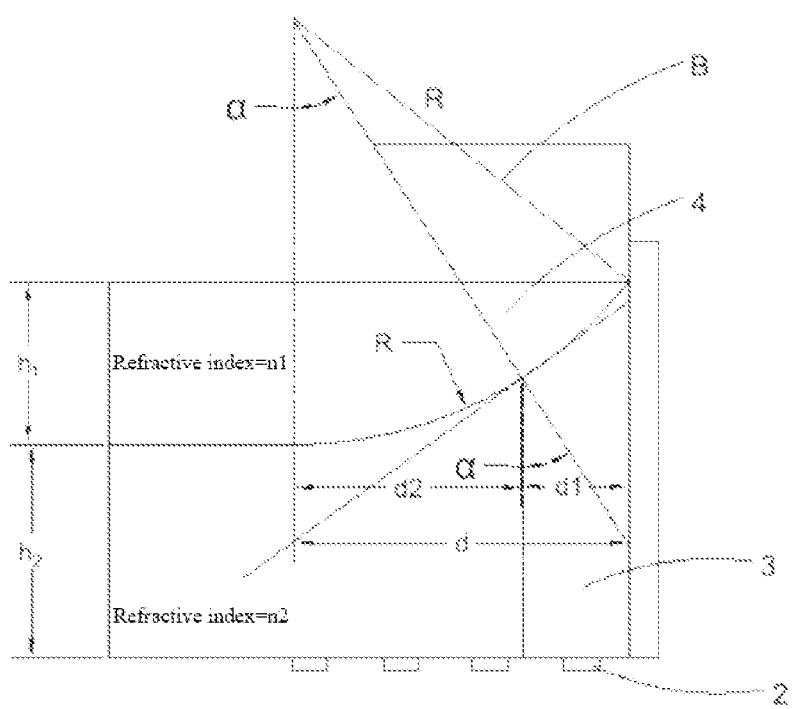
FIG. 6 shows a schematic diagram of a size of a first kind of bonding interface at the edge of the backlight module in the second embodiment.

As shown in FIG. 4, FIG. 5 and FIG. 6, in the present embodiment, the refractive surface 31 is selected to be shaped like a smooth curved surface with an arc-shaped section, as shown in FIG. 5, the refractive surface 31 is an arc with a radian radius being equal to or slightly greater than a thickness of the diffusion film 4. A backlight ray may be refracted inwards by an inner side part, close to the center of the screen, of the refractive surface 31, and a total-reflection surface may be formed on an outer side part of the refractive surface 31 to reflect the backlight ray to the border, and thus, the dark area B where no backlight rays can enter may be formed on the edge of the backlight module. It can be known that the refractive surface 31 includes a partial refractive surface close to a center of a screen and a reflective surface close to a border in the embodiment of the present application, and the two optical surfaces respectively act on the edge of the backlight module to form the dark area B where no backlight rays can enter. In the present embodiment, the diffusion film 4 is different from the light guide plate 3 in refractive index, and thus, specified refraction and reflection can be formed on the bonding interface between the both. In the present embodiment, it is selected that the refractive index of the diffusion film 4 is greater than that of the light guide plate 3.

Figure 7:
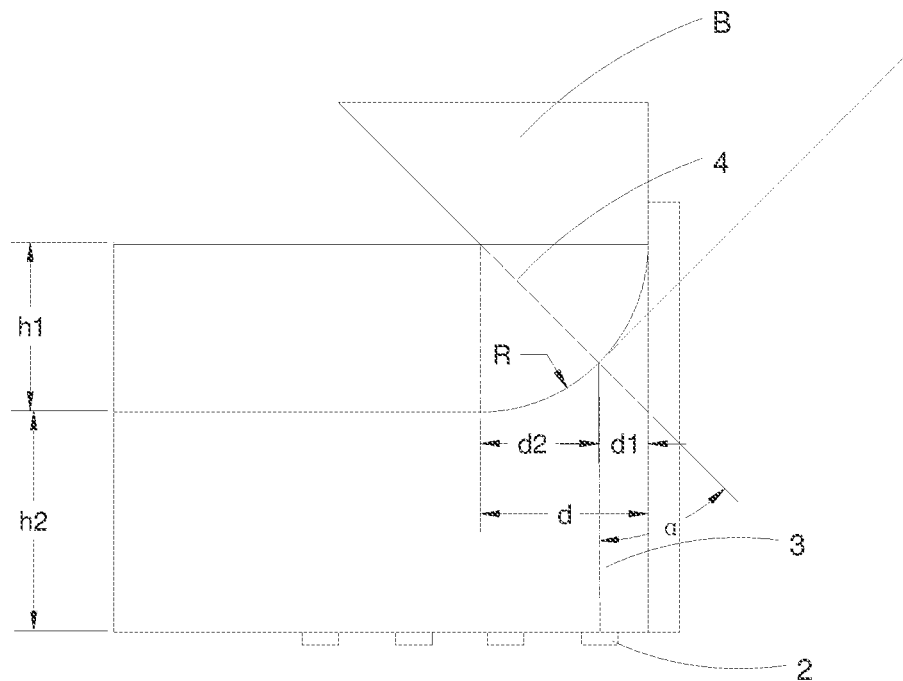
FIG. 7 shows a schematic diagram of a size of a second kind of bonding interface at the edge of the backlight module in the second embodiment.

A calculation formula for an angle of total reflection is expressed as: sinic=1/n'. An angle of reflection refers to an included angle formed by a reflection ray and a boundary normal. When a ray is reflected, the angle of reflection is always located in a plane determined by an incident ray and a normal and is equal to an incident angle. FIG. 7 shows a schematic diagram of a size of a second kind of bonding interface at the edge of the backlight module in the second embodiment. The radius of the arc of the refractive surface 31 is equal to ¼ of the thickness of the diffusion film 4, and thus, the entire width of the refractive surface 31 can be reduced as much as possible. At the same time, there is a smaller included angle between the refractive surface 31 on the outmost side and an optical axis of the light source, so that a better reflection effect can be achieved, and total reflection is basically achieved.

In the embodiment according to FIG. 7, in the embodiment (referring to FIG. 7) in which the refractive surface 31 is ¼ of the arc, that is, when the radius of the arc is the same as a height of the arc, wherein the incident angle is a, and a refraction formula can be expressed as:

$$n_2 \cdot \sin \alpha = n_1$$

$$R \cdot \sin \alpha = d_2$$

$$d_1 + d_2 = d = R$$

wherein R is a radius of the refractive surface, $d_1$ is a width of the reflective surface, $d_2$ is a width of the partial refractive surface, d is an entire width of the refractive surface 31. Therefore, a position of a critical point between the reflective surface and the refractive surface can be obtained according to the above-mentioned formula, and then, the radius of the refractive surface can be selected to obtain the corresponding width of the dark area. Of course, it can be obviously understood by the skilled in the art that the above-mentioned calculation formula can also be flex- ibly adjusted according to variables such as a refractive index and a screen size, or new changes, but is not used as a restriction on the embodiment of the present application.

FIG. 6 shows a schematic diagram of a size of a first kind of bonding interface at the edge of the backlight module in the second embodiment. In this case, the radius of the arc of the refractive surface 31 is greater than the thickness of the diffusion film 4, in this way, an inner edge (or referred to as a shielding area) of an area, where the light source is reflected, on the refractive surface 31 may be farther away from the direction of the outer frame, and thus, a larger dark area on a light emitting side can be formed to prevent light leakage on the edge. However, in this case, there is a larger inclined angle between the refractive surface 31 on the outmost side and the optical axis of the light source, so that a situation that light guide to the outside of a clearance along a light emitting axis cannot occur.

The incident angle is a, and a refraction formula can be expressed as:

$$n_2 \cdot \sin \alpha = n_1$$

$$\begin{cases} R \cdot \sin \alpha = d_2 \\ d_1 + d_2 = d \\ d^2 + (R - h_1)^2 = R^2 \end{cases},$$

wherein $h_1$ is a thickness of the diffusion film, R is a radius of the refractive surface, $d_1$ is a width of the reflective surface, $d_2$ is a width of the partial refractive surface, and d is an entire width of the refractive surface 31. Therefore, a position of a critical point between the reflective surface and the refractive surface can be obtained according to the above-mentioned formula, and then, the radius of the refractive surface can be selected to obtain the corresponding width of the dark area. Of course, it can be obviously understood by the skilled in the art that the above-mentioned calculation formula can also be flexibly adjusted according to variables such as a refractive index and a screen size, or new changes, but is not used as a restriction on the embodiment of the present application.

Figure 8:
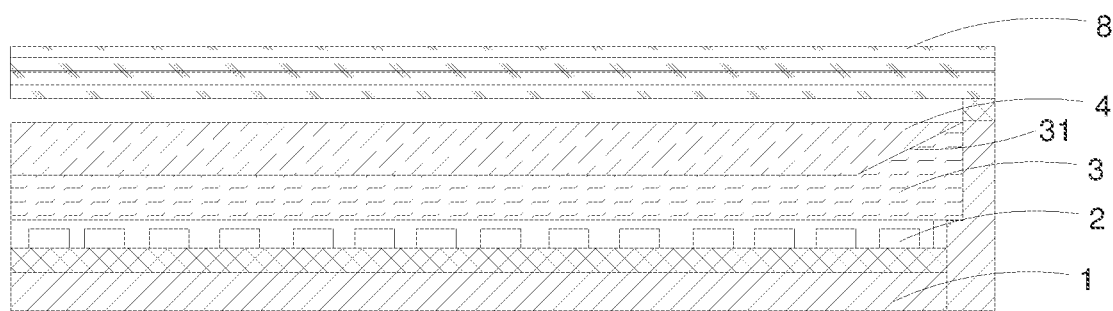
FIG. 8 shows a schematic structural diagram of a section of a display panel in a third embodiment.
Figure 9:
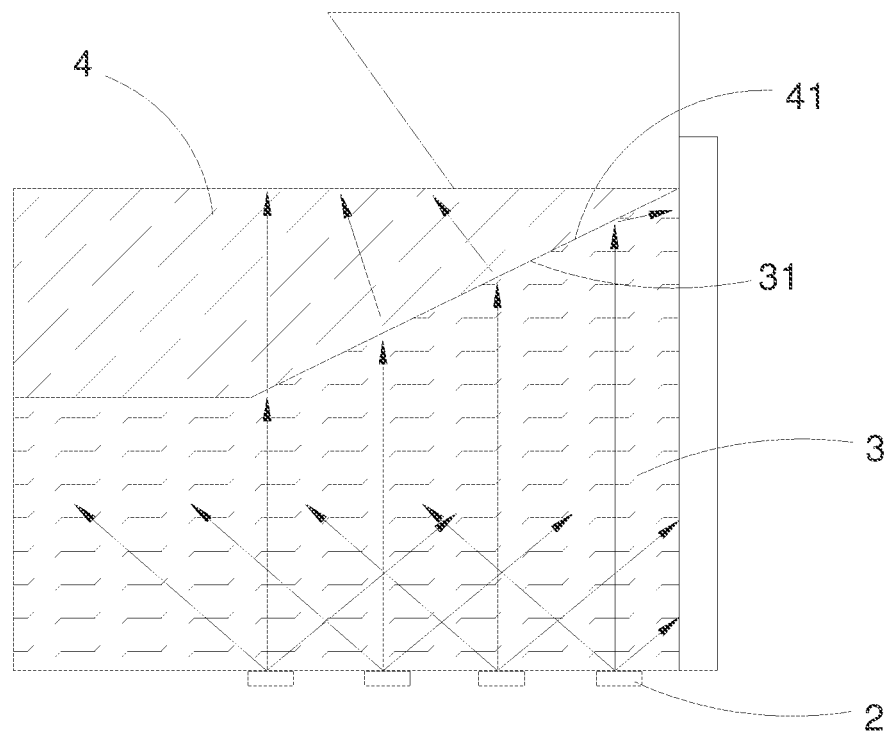
FIG. 9 shows a schematic structural diagram of a local section at an edge of a backlight module in the third embodiment.

FIG. 8 shows a schematic structural diagram of a section of a display panel in a third embodiment, and FIG. 9 shows a schematic structural diagram of a local section at an edge of a backlight module in the third embodiment. An embodiment of the present application further provides a backlight module, including a light source 2, a light guide plate 3, and a diffusion film 4; the light source 2 is configured to provide a light source: the light guide plate 3 includes a light guide incident surface facing the light source 2 and a light guide emergent surface facing a light emitting direction, a peripheral edge of the light guide emergent surface is a refractive surface 31, and a distance from an outer edge of the refractive surface 31 to the light guide incident surface is longer than a distance from an inner edge of the refractive surface 31 to the light guide incident surface; and the diffusion film 4 includes a diffusion incident surface and a diffusion emergent surface, and a shape of the diffusion incident surface is fitted to a shape of the light guide emergent surface. The refractive surface 31 is a single-segment or multi-segment plane.

Figure 10:
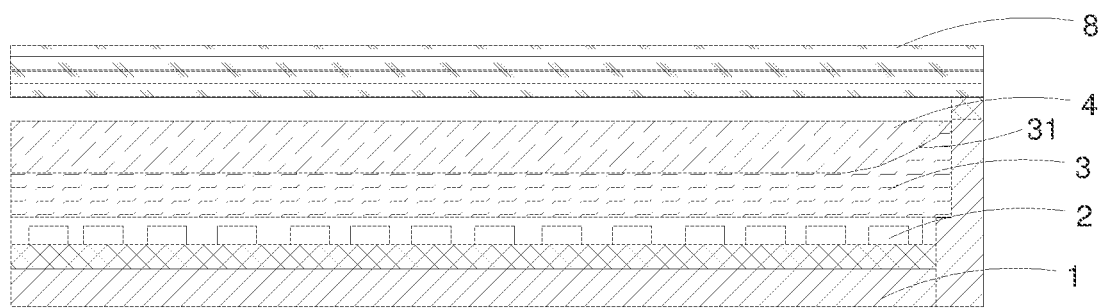
FIG. 10 shows a schematic structural diagram of a section of a display panel in a fourth embodiment.
Figure 11:
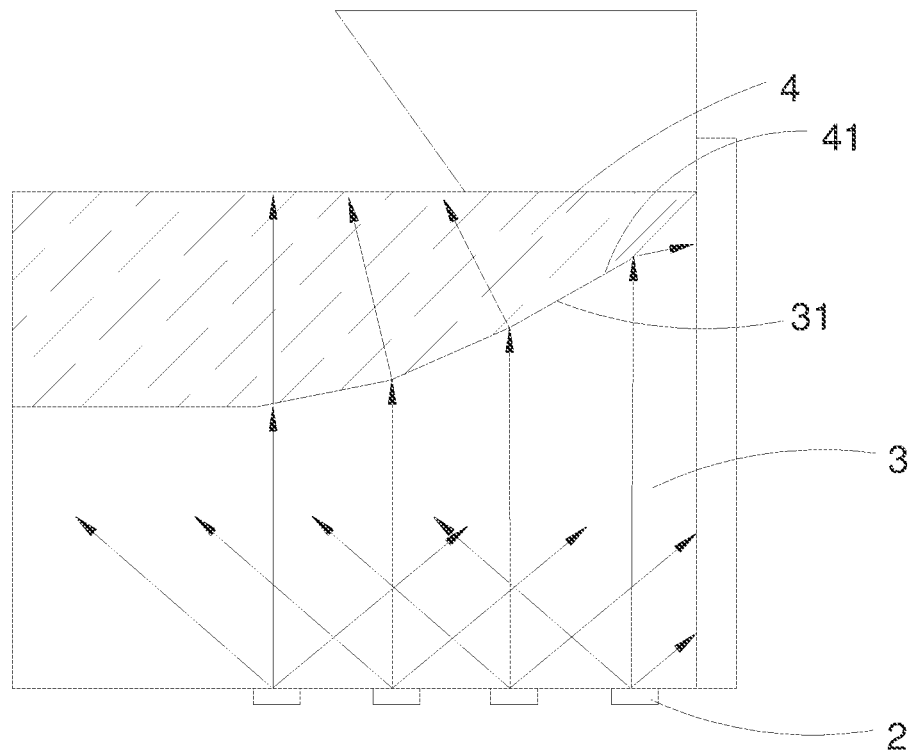
FIG. 11 shows a schematic structural diagram of a local section at an edge of a backlight module in the fourth embodiment.

FIG. 10 shows a schematic structural diagram of a section of a display panel in a fourth embodiment, and FIG. 11 shows a schematic structural diagram of a local section at an edge of a backlight module in the fourth embodiment: and a multi-segment smooth curved surface is selected as the refractive surface 31. Therefore, inclination angles of a refractive area and a reflective area can be more clearly divided by using the multi-segment smooth curved surface, and thus, the discoloration of the outer edge due to uneven weakening of rays is avoided.

In a possible implementation, in a case that the refractive surface 31 is a multi-segment smooth curved surface, a radius of each segment of the smooth curved surface is gradually reduced from inside to outside, so that a greater refractive transmittance is obtained by an incident angle closer to a right angle in the refractive area: and as a smooth curved surface with a smaller radius is disposed in the reflective area, a better dark area effect can be achieved.

In a possible implementation, the refractive surface 31 is a multi-segment smooth curved surface, wherein a curvature of the smooth curved surface closer to the outer edge of the refractive surface 31 in each smooth curved surface is greater. Thus, a better dark area effect can be achieved, and the smooth curved surface has a more uniform light guide effect.

In a possible implementation, a shielding area is formed on a position, close to the outer edge of the refractive surface 31 to shield a ray, reflected and incident to the shielding area, from the light source 2. A calculation formula for a width of the shielding area refers to calculation embodiments of the above-mentioned two sets of formulae. An inclination angle of the refractive surface 31 in the shielding area is greater than a refraction critical angle of the light guide incident surface, and inclination angles of other areas than the shielding area on the refractive surface 31 are equal to or smaller than the refraction critical angle of the light guide incident surface.

In a possible implementation, the outer edge of the refractive surface 31 extends to an outer edge of the diffusion incident surface. That is, the outer edge of the refractive surface 31 and the outer edge of the diffusion film are just superimposed on a top edge of the diffusion film, in this way, a refractive interface between the light guide plate and the diffusion film points to the outer edge, and thus, dark areas can be respectively formed to two sides of a direction pointed by the refractive interface to avoid light leakage on the edge.

In a possible implementation, the diffusion film 4 is provided with an adaptive surface 41 corresponding to the refractive surface 31, the adaptive surface 41 is intended to be completely fitted to the arc surface of the refractive surface of the light guide plate, and a distance from an outer edge of the adaptive surface 41 to the diffusion emergent surface is shorter than a distance from an inner edge of the adaptive surface 41 to the diffusion emergent surface.

Figure 12:
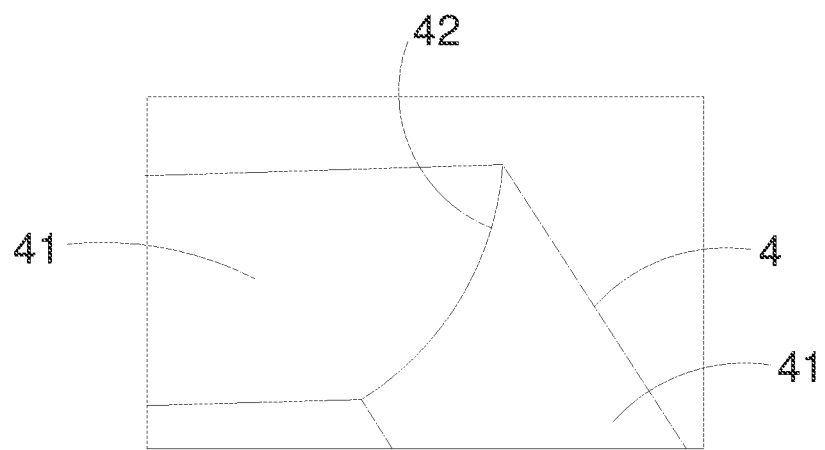
FIG. 12 shows a schematic structural diagram of an implementation state of a mask adopted in embodiments of the present application.

FIG. 12 shows a schematic structural diagram of an implementation state of a mask adopted in embodiments of the present application. In a possible implementation, the light guide plate 3 includes four refractive surfaces 31 connected end to end, the four refractive surfaces 31 are respectively located on four outer side surfaces of the light guide plate 3, and the two adjacent refractive surfaces 31 are connected by a boundary line 42, thereby forming an arc-shaped ridge line on an edge boundary to form a dark area for avoiding light leakage on the edge.

In a second aspect, an embodiment of the present application provides a display device, including a display module and a backlight module which is the backlight module mentioned as above.

It should be easily understood that "on . . . ", "above . . . " and "over . . . " in the present application should be explained in a widest way, so that "on . . . " not only means "directly located on a certain object", but also means "on a certain object" and the presence of an intermediate feature or layer therebetween, and "above . . . " and "over . . . " not only means "above a certain object" or "over a certain object", but also means "above a certain object" or "over a certain object" and no presence of an intermediate feature or layer therebetween (that is, directly located on a certain object). The term "base substrate" used herein refers to a material of a subsequent material layer added thereon. The base substrate itself can be patterned. The material added on the top of the base substrate can be patterned or kept not to be patterned. In addition, the base substrate may include a series of materials such as silicon, germanium, gallium arsenide, and indium phosphide within a wide range. Alternatively, the base substrate may be made of a nonconductive material (such as glass, plastics or a sapphire wafer).

The term "layer" used herein may refer to a material part including an area with a certain thickness. The layer may extend over an entire lower-layer or overlying structure, or may have smaller range than the lower-layer or overlying structure. In addition, the layer may be an area of a homogeneous or inhomogeneous continuous structure, and has a smaller thickness than the continuous structure. For example, the layer may be located between a top surface and a bottom surface of the continuous structure or between any paired transverse planes on the top surface and the bottom surface. The layer may extend transversely, perpendicularly and/or along a conical surface. The base substrate may be a layer, or may include one or more layers therein, and/or may be provided with one or more layers located on, above and/or below the base substrate. The layer may include a plurality of layers. For example, an interconnected layer may include one or more conductors and contact layers (in which contacts, interconnecting lines and/or via holes are formed) and one or more dielectric layers.

Finally, it should be noted that the above-mentioned embodiments are only intended to describe technical solutions of the present application, rather than to limit the present application. Although the present application has been described in detail with reference to the aforementioned embodiments, it should be understood by those of ordinary skill in the art that they may still modify the technical solutions recorded in each of the aforementioned embodiments or equivalently substitute parts or all of technical features therein. These modifications or substitutions do not enable the essences of the corresponding technical solutions to depart from scopes of the technical solutions of the embodiments of the present application.

What is claimed is:

1. A backlight module, comprising:
a light source, configured to provide a light source;
a light guide plate, comprising a light guide incident surface facing the light source and a light guide emergent surface facing a light emitting direction; a peripheral edge of the light guide emergent surface being a refractive surface, and a distance from an outer edge of the refractive surface to the light guide incident surface being longer than a distance from an inner edge of the refractive surface to the light guide incident surface; a shielding area is formed on a position, close to the outer edge, of the refractive surface to shield a ray, reflected and incident to the shielding area, from the light source; an inclination angle of the refractive surface in the shielding area is greater than a refraction critical angle of the light guide incident surface, and inclination angles of other areas than the shielding area on the refractive surface are equal to or smaller than the refraction critical angle of the light guide incident surface; and a diffusion film, comprising a diffusion incident surface and a diffusion emergent surface, a shape of the diffusion incident surface being fitted to a shape of the light guide emergent surface;

wherein the refractive surface is a single-segment or multi-segment smooth curved surface, or the refractive surface is a multi-segment plane.

2. The backlight module of claim 1, wherein the refractive surface is a curved surface with an arc-shaped section, and a radius of the refractive surface is equal to a thickness of the diffusion film.

3. The backlight module of claim 2, wherein the refractive surface comprises a partial refractive surface close to a center of a screen and a reflective surface close to a border, and a radius R of the refractive surface, a width $d_1$ of the reflective surface, a width $d_2$ of the partial refractive surface, an entire width d of the refractive surface and an incident angle $\alpha$ satisfies the following conditions:

$R \cdot \sin \alpha = d_2$ $d_1 + d_2 = d = R.$

4. The backlight module of claim 1, wherein the refractive surface is a curved surface with an arc-shaped section, and a radius of an arc of the refractive surface is greater than a thickness of the diffusion film.

5. The backlight module of claim 4, wherein the refractive surface comprises a partial refractive surface close to a center of a screen and a reflective surface close to a border, and a thickness $h_1$ of the diffusion film, a width $d_1$ of the reflective surface, a width $d_2$ of the partial refractive surface, an entire width d of the refractive surface and an incident angle $\alpha$ satisfies the following conditions:

$$\begin{cases} R \cdot \sin \alpha = d_2 \\ d_1 + d_2 = d \\ d^2 + (R - h_1)^2 = R^2 \end{cases}.$$

6. The backlight module of claim 1, wherein the refractive surface is a multi-segment smooth curved surface, and a radius of each segment of the smooth curved surface is gradually reduced from inside to outside.

7. The backlight module of claim 1, wherein the refractive surface is a multi-segment smooth curved surface, wherein a curvature of the smooth curved surface closer to the outer edge of the refractive surface in each smooth curved surface is greater.

8. The backlight module of claim 1, wherein the outer edge of the refractive surface extends to an outer edge of the diffusion incident surface.

9. The backlight module of claim 1, wherein the diffusion film is provided with an adaptive surface corresponding to the refractive surface, and a distance from an outer edge of the adaptive surface to the diffusion emergent surface is shorter than a distance from an inner edge of the adaptive surface to the diffusion emergent surface.

10. The backlight module of claim 1, wherein the light guide plate comprises four refractive surfaces connected end to end, the four refractive surfaces are respectively located on four outer side surfaces of the light guide plate, and the two adjacent refractive surfaces are connected by a boundary line.

11. The backlight module of claim 1, wherein a refractive index of the diffusion film is greater than a refractive index of the light guide plate.

12. A display device, comprising a display module and a backlight module which is the backlight module of claim 1.

* * * * *